US008533484B2

(12) United States Patent
Serotta et al.

(10) Patent No.: US 8,533,484 B2
(45) Date of Patent: Sep. 10, 2013

(54) PASSWORD-PROTECTED PHYSICAL TRANSFER OF PASSWORD-PROTECTED DEVICES (75) Inventors: Paul Andrew Serotta, Roseville, CA (US); Jeffery Allen Reich, Sheridan, CA (US); Chris Anthony Madden, Stepaside (IE)

(73) Assignee: Verifone, Inc., San Jose, CA (US)

( * ) Notice: Subject to any disclaimer, the term of this patent is extended or adjusted under 35 U.S.C. 154(b) by 770 days.

(21) Appl. No.: 12/748,776

(22) Filed: Mar. 29, 2010

(65) Prior Publication Data

US 2011/0239000 A1 Sep. 29, 2011

(51) Int. Cl.
*G06F 21/00* (2013.01)

(52) U.S. Cl.
USPC .......................................... 713/183; 380/277

(58) Field of Classification Search
None
See application file for complete search history.

(56) References Cited

U.S. PATENT DOCUMENTS

| 5,371,798 | A | 12/1994 | McWhortor |
| 5,442,165 | A * | 8/1995 | Atsumi et al. ................ 235/492 |
| 6,003,763 | A | 12/1999 | Gallagher et al. |
| 6,360,952 | B1 | 3/2002 | Kimlinger et al. |
| 6,647,497 | B1 * | 11/2003 | Cromer et al. .................. 726/16 |
| 2001/0014881 | A1 | 8/2001 | Drummond et al. |
| 2002/0063152 | A1 | 5/2002 | Goodwin, III et al. |
| 2002/0180584 | A1 | 12/2002 | McGregor et al. |
| 2003/0033348 | A1 * | 2/2003 | King et al. ..................... 709/201 |
| 2003/0046589 | A1 * | 3/2003 | Gregg ............................ 713/201 |
| 2005/0121513 | A1 | 6/2005 | Drummond et al. |
| 2005/0210173 | A1 | 9/2005 | Kehoe et al. |
| 2006/0064493 | A1 * | 3/2006 | Hammell et al. ............. 709/227 |
| 2008/0109909 | A1 * | 5/2008 | Rhoades et al. ................ 726/27 |
| 2008/0120508 | A1 * | 5/2008 | Marconi et al. ............... 713/184 |
| 2009/0198618 | A1 * | 8/2009 | Chan et al. ...................... 705/66 |
| 2009/0276358 | A1 | 11/2009 | Dutta et al. |
| 2012/0084855 | A1 * | 4/2012 | Hofer et al. ..................... 726/18 |

OTHER PUBLICATIONS

USPTO FOA mailed Jul. 12, 2012 in connection with U.S. Appl. No. 11/465,479.

* cited by examiner

*Primary Examiner* — Cordelia Zecher
(74) *Attorney, Agent, or Firm* — Ladas & Parry LLP (57) ABSTRACT A method for password-protected physical transfer of password-protected devices including at a receiving location, generating at least one security file including an encrypted element generated using a one-way encryption function utilizing at least one secure code, transmitting the at least one security file to a shipping location at which the password-protected devices are located, at the shipping location, using at least one shipping location password, loading the at least one security file into at least one password-protected device, shipping the at least one password-protected device to the receiving location and at the receiving location, employing the at least one secure code to supply an input to the at least one password-protected device and employing the at least one security file to enable establishment of at least one receiving location password for the at least one password-protected device which replaces the at least one shipping location password.

16 Claims, 8 Drawing Sheets

PASSWORD-PROTECTED PHYSICAL TRANSFER OF PASSWORD-PROTECTED DEVICES

FIELD OF THE INVENTION

The present invention relates to manufacture and deployment of password-protected devices.

BACKGROUND OF THE INVENTION

The following patent publications are believed to represent the current state of the art:

U.S. Published Patent Application Nos. 2001/0014881 and 2005/0121513.

SUMMARY OF THE INVENTION

The present invention seeks to provide a method for password-protected physical transfer of password-protected devices and password-protected devices for physical transfer thereby.

There is thus provided in accordance with a preferred embodiment of the present invention a method for password-protected physical transfer of password-protected devices including at a receiving location, generating at least one security file including an encrypted element generated using a one-way encryption function utilizing at least one secure code, transmitting the at least one security file to a shipping location at which the password-protected devices are located, at the shipping location, using at least one shipping location password, loading the at least one security file into at least one password-protected device, shipping the at least one password-protected device having loaded therein the at least one security file from the shipping location to the receiving location and at the receiving location, employing the at least one secure code to supply an input to the at least one password-protected device and employing the at least one security file to enable establishment of at least one receiving location password for the at least one password-protected device which replaces the at least one shipping location password.

Preferably, the at least one security file utilizes plural secure codes held at the receiving location. Additionally, the security file is created by employing a one-way encryption function utilizing the plural secure codes. Additionally, the security file is authenticated to confirm that the security file was created at the receiving location and was not modified subsequently.

In accordance with a preferred embodiment of the present invention the password-protected devices are point of sale (POS) terminals which are subject to stringent security requirements at all stages of their manufacture and transfer to their operating locations. Additionally, the security requirements are requirements established by the PCI Security Standards Council.

Preferably, personnel at the shipping location, using the at least one shipping location password, perform security-sensitive operations on the at least one password-protected device and load the at least one security file onto the at least one password-protected device when the at least one password-protected device is in a shipping location password protected (SLPP) state. Additionally, personnel at the shipping location, using the at least one shipping location password, load the at least one security file into the at least one password-protected device and cause the shipping location password to become expired whereby the at least one password-protected device is in a password-protected, password-inaccessible (PPPI) state, wherein it can no longer be accessed by using the shipping location password and cannot be accessed until the at least one receiving location password is implemented.

In accordance with a preferred embodiment of the present invention at the receiving location the at least one password-protected device compares a string created at the receiving location using the at least one secure code with the encrypted element, thereby to enable implementation of the at least one receiving location password. Additionally, personnel at the receiving location, using at least one receiving location password, perform security-sensitive operations on the at least one password-protected device when the at least one password-protected device is in a first receiving location password protected (FRLPP) state.

Preferably, the at least one security file includes a plurality of security files which are adapted to be accessed in a predetermined sequence. Additionally, personnel at the shipping location, using the at least one shipping location password, perform security-sensitive operations on the at least one password-protected device and load the plurality of security files onto the at least one password-protected device, when the at least one password-protected device is in a shipping location password protected (SLPP) state.

In accordance with a preferred embodiment of the present invention personnel at the shipping location, using the at least one shipping location password, load the plurality of security files into the at least one password-protected device and cause the shipping location password to become expired whereby the at least one password-protected device is in a password-protected, password-inaccessible (PPPI) state, wherein it can no longer be accessed by using the shipping location password and cannot be accessed until the at least one receiving location password is implemented. Additionally, at the receiving location the at least one password-protected device compares a string created at the receiving location using the at least one secure code with the encrypted element, thereby to enable implementation of the at least one receiving location password.

Preferably, personnel at the receiving location, using at least one receiving location password, perform security-sensitive operations on the at least one password-protected device when the at least one password-protected device is in a first receiving location password protected (FRLPP) state. Additionally, personnel at a second receiving location, using at least one second receiving location password, perform security-sensitive operations on the at least one password-protected device when the at least one password-protected device is in a second receiving location password protected (SRLPP) state.

There is also provided in accordance with another preferred embodiment of the present invention a password-protected device including a housing, a user interface, a memory, computer hardware located within the housing and interfacing with the user interface and the memory, computer software running on the computer hardware and including an operating system and at least one security file stored in the memory and containing code useable by the operating system to enable a change in a password responsive to at least one predetermined coded input, the at least one security file including an encrypted element generated using a one-way encryption function utilizing at least one secure code;

Preferably, the password-protected device also includes functionality for comparing a string created using the at least one predetermined coded input with the encrypted element.

Preferably, the at least one security file includes a plurality of security files which are accessible only in a predetermined sequence.

In accordance with a preferred embodiment of the present invention the password-protected device is a point of sale (POS) terminal which meets security requirements established by the PCI Security Standards Council.

BRIEF DESCRIPTION OF THE DRAWINGS

The present invention will be understood from the following detailed description taken in conjunction with the drawings in which.

DETAILED DESCRIPTION OF A PREFERRED EMBODIMENT

Figure 1A:
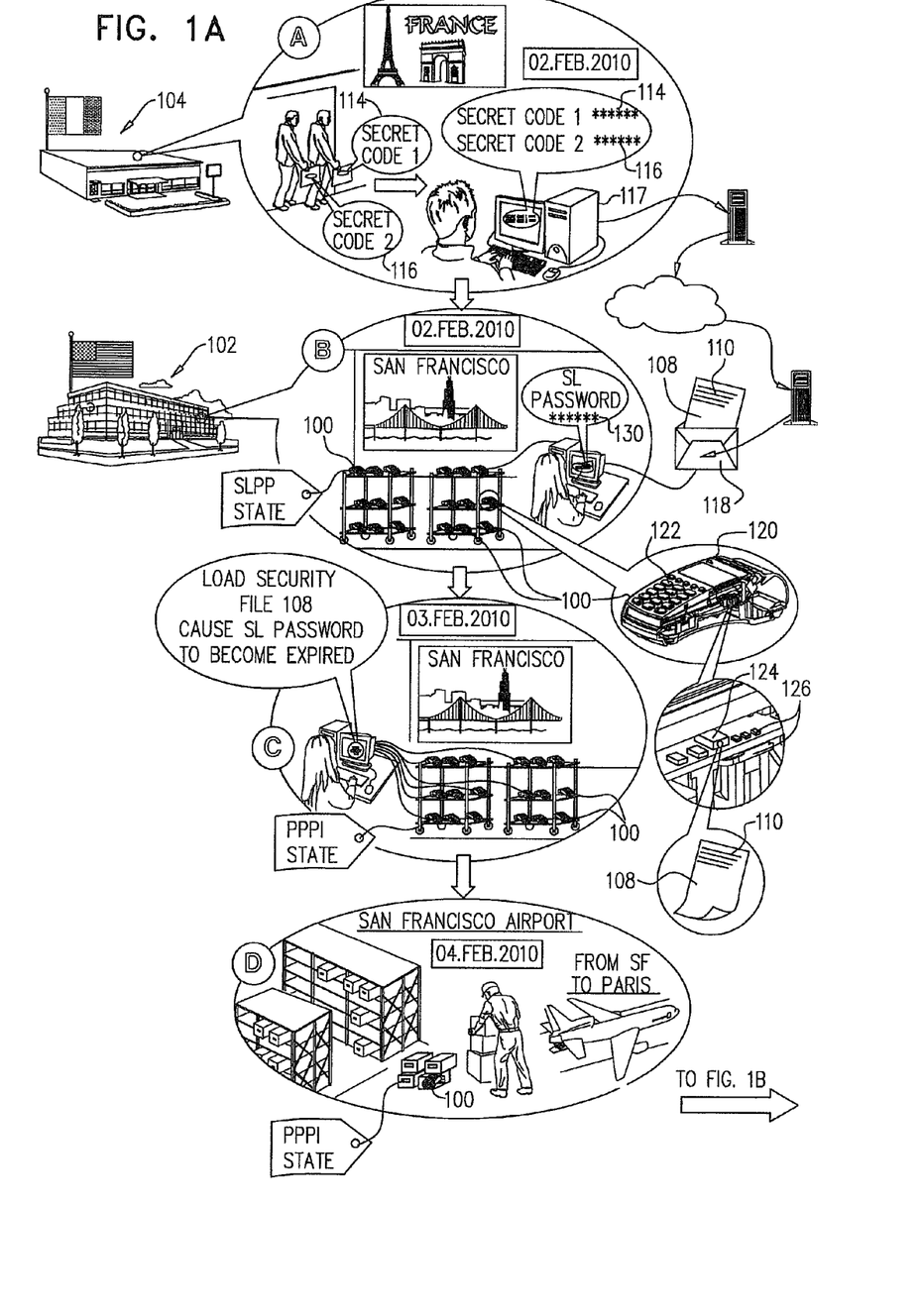
FIGS. 1A-1D are together a simplified pictorial illustration of applications of a preferred embodiment of the present invention.
Figure 1B:
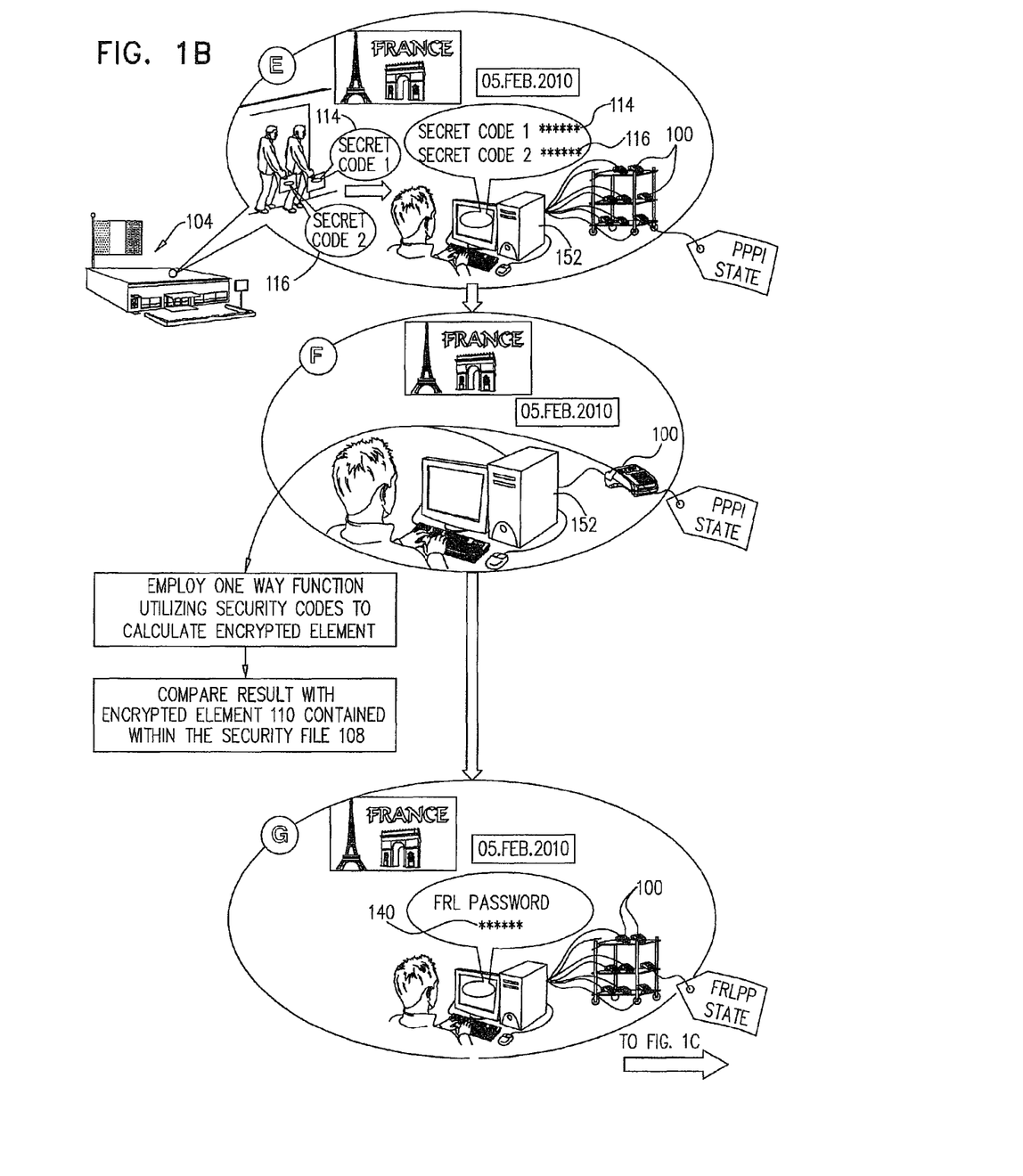
Figure 1C:
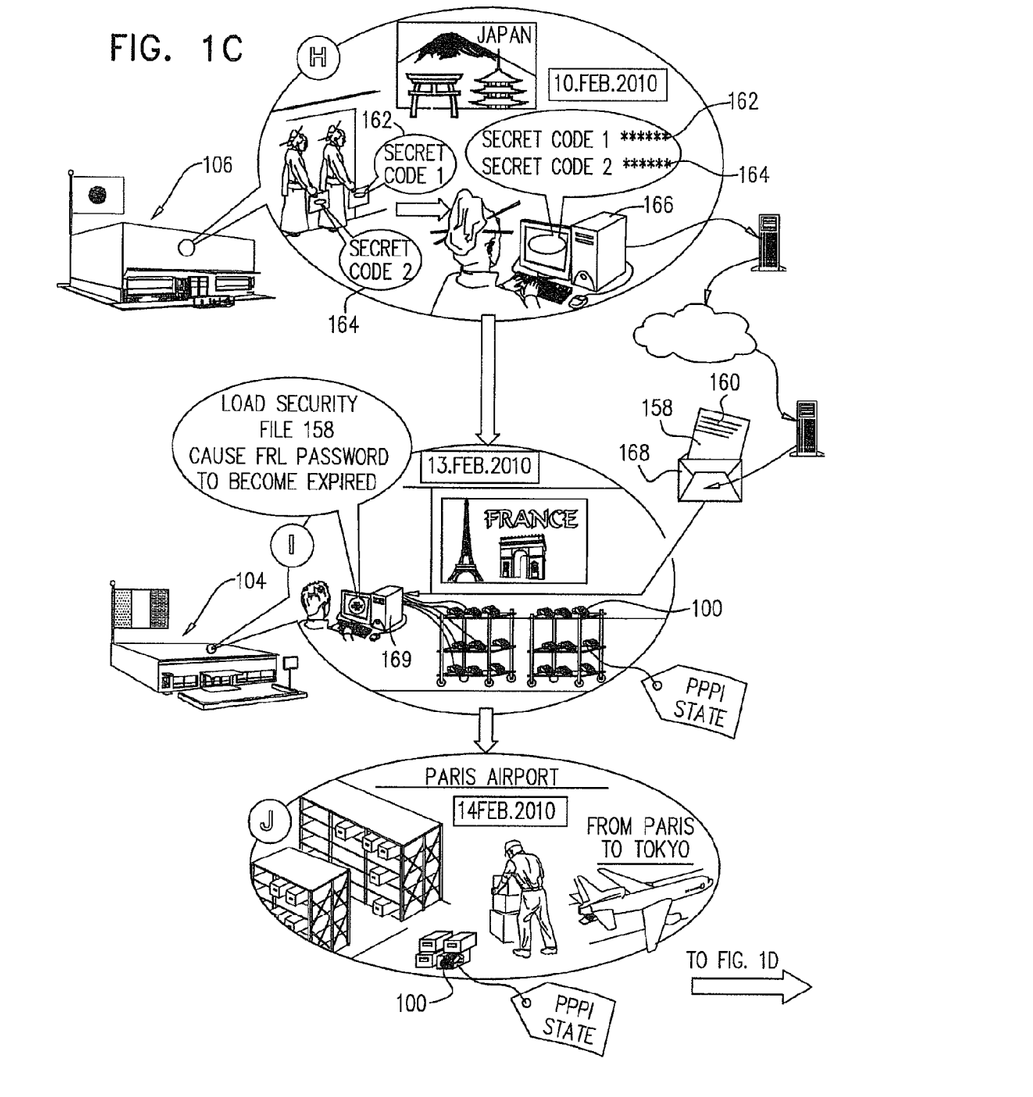
Figure 1D:
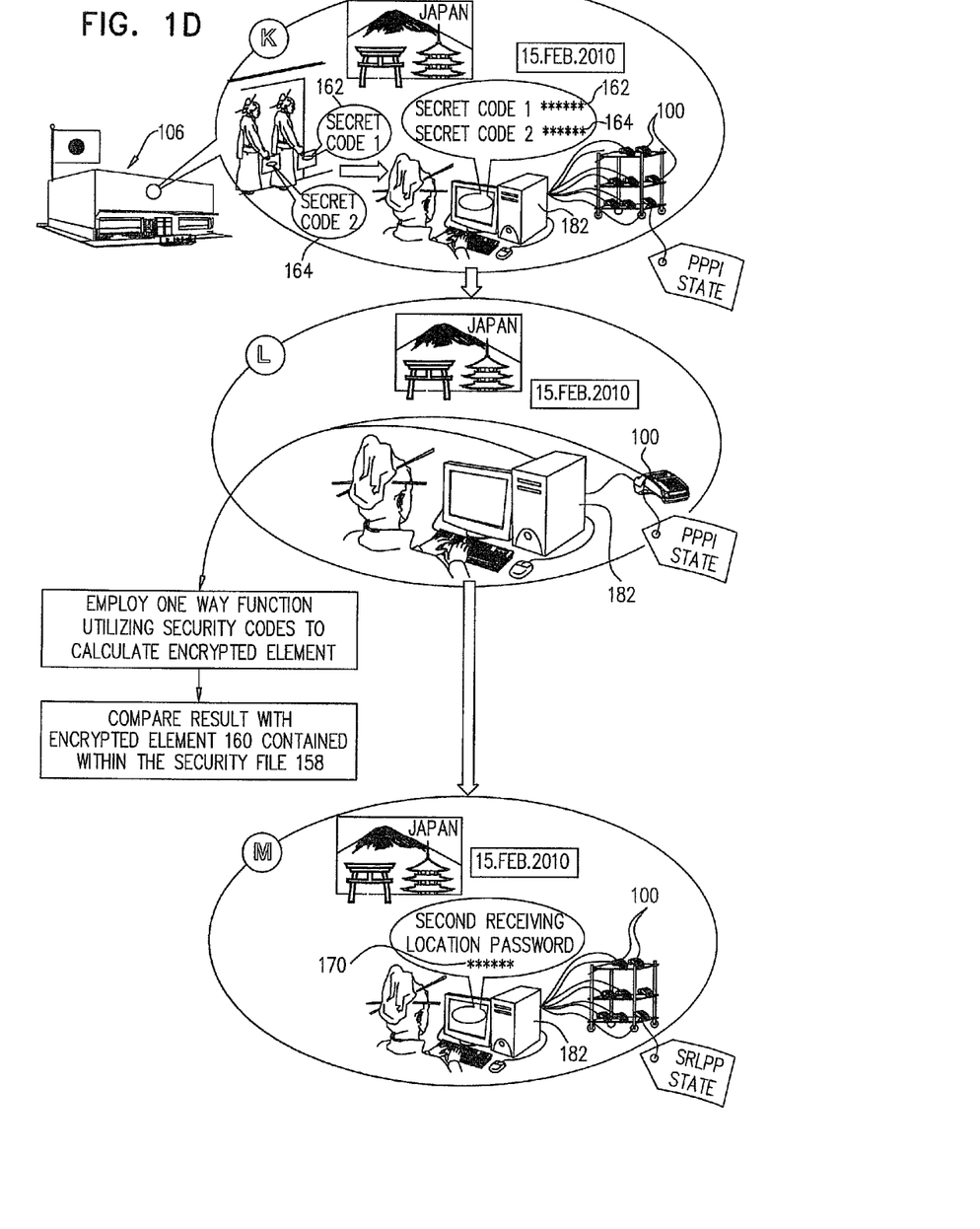

Reference is now made to FIGS. 1A-1D, which illustrate one example of a preferred embodiment of the present invention. As seen in FIGS. 1A-1D, the present invention provides a method for password-protected physical transfer of password-protected devices 100 from a shipping location, such as a manufacturing facility 102, typically located in San Francisco, to a first receiving location, such as a deployment facility 104, typically located in Paris, and, optionally, onward to second receiving location, such as a customer location 106, typically located in Tokyo.

As shown at A, in accordance with a preferred embodiment of the present invention, at least one security file, indicated pictorially by reference numeral 108, including an encrypted element, indicated pictorially by reference numeral 110, is generated at the first receiving location, here deployment facility 104, using a one-way encryption function utilizing at least one secure code. As illustrated, typically, two secret codes 114 and 116, such as strings containing at least six characters, which are each individually held by a trusted individual, are input to a computer 117.

Preferably, the computer 117 employs a one-way encryption function, such as a hash function, e.g. SHA1, SHA256 or MD5, utilizing the two secret codes 114 and 116 to generate the at least one security file 108 including the encrypted element 110. The at least one security file 108 is preferably authenticated by computer 117, or by another computer, to confirm that the security file 108 has been created and sent by the deployment facility 104 and has not been modified subsequently.

The at least one security file 108 may be sent electronically, as by an email 118, to the shipping location 102 at which the password-protected devices 100 are located. It is appreciated that transmission of the security file 108 need not necessarily be encrypted or otherwise protected, since the contents of the security file 108, particularly the encrypted element 110, are themselves encrypted.

In the illustrated embodiment, as shown at B, the password-protected devices 100 are point of sale (POS) terminals, which are subject to stringent security requirements, such as PCI version2 established by the PCI Security Standards Council, at all stages of their manufacture and transfer to their operating locations. For the purposes of the present description and claims, the term "point of sale terminals" includes, inter alia, PIN pads, electronic cash registers, ATMs, card payment terminals and the like. It is appreciated that the present invention is not limited to POS terminals but also applies to other types of password-protected devices which are subject to stringent security requirements.

It is appreciated that the term "password" is used in a general sense to refer to any type of suitable credential, such as a password, passphrase and PIN.

The password-protected devices 100 may have various alternative functionalities. Generally speaking, they each include a housing 120, a user interface 122 such as a keyboard, a memory 124, adapted to contain, inter alia, security file 108, computer hardware 126, located within the housing 120 and interfacing with the user interface 122 and the memory 124, computer software running on computer hardware 126, including an operating system and containing code useable by the operating system to enable a change in a password, responsive to at least one predetermined coded input and to the encrypted element 110 included in the security file 108.

Additionally, the password-protected devices 100 may also incorporate functionality for comparing a received string with the encrypted element 110. As a further alternative, the password-protected devices 100 may also have functionality for computing a string, using a one way function, which may be identical to the one way function employed to generate the encrypted element 110.

Personnel at the shipping location 102, using at least one shipping location password 130, may perform security-sensitive operations on the password-protected devices 100, such as performing tests, loading software, configuring the devices, such as adding serial numbers, and adding encryption keys to enable remote servicing of the password-protected devices 100. At this stage, the shipping location password-protected devices 100 are considered to be in a "shipping location password protected (SLPP) state".

As seen at C, following receipt of the at least one security file 108 at the shipping location 102, typically by email 118, personnel at the shipping location 102, using the least one shipping location password 130, preferably confirm the authenticity of the received at least one security file 108 and load the at least one security file 108 into at least one password-protected device 100. At this stage the personnel at the shipping location cause the shipping location password 130 to become expired, such that security-sensitive subsequent operational/management access to the password-protected devices 100 requires a new password. At this stage, the password-protected devices 100 are considered to be in an intermediate password-protected state, wherein they can no longer be accessed by using the shipping location password 130 and they cannot be accessed until a new authorized password is implemented, as described hereinbelow. This state is termed a "password-protected, password-inaccessible (PPPI) state".

As seen at D, at least one password-protected device 100 in the PPPI state, having loaded therein at least one security file 108, is shipped from the shipping location 102 to the first receiving location 104.

As illustrated at E-G, thereafter, at the first receiving location 104, personnel at the first receiving location 104 preferably employ the secure codes 114 and 116, originally used to create the encrypted element 110 incorporated in the security file 108, to supply an input to the received at least one password-protected device 100 in the PPPI state and employ the at least one security file 108 to enable establishment of at least one first receiving location password 140 for the received at least one password-protected device 100, which replaces the at least one shipping location password 130, which previously expired.

As indicated at E, in the illustrated embodiment, following arrival of the password-protected devices 100 in the PPPI state at the first receiving location 104, the two secret codes 114 and 116, each typically individually held by the same trusted individuals referenced above at A, are preferably input to a computer 152, which may be, but need not necessarily be, the same as computer 117, which supplies inputs to the received password-protected devices 100 in the PPPI state.

As illustrated in F, the computer 152 may transmit the secret codes 114 and 116 directly to the password-protected devices 100 in the PPPI state. In such a case, each password-protected device 100 in the PPPI state employs the one way function to compute a result which it compares with the encrypted element 110 included within the security file 108.

Alternatively, personnel at the first receiving location 104 may enter the secret codes 114 and 116 directly into to the password-protected devices 100 in the PPPI without using computer 152. In such a case, the password-protected device 100 in the PPPI state uses the one way function to compute a result which it compares with the encrypted element 110 included within the security file 108.

As a further alternative, computer 152 may use the one way function to compute a result which it supplies to the password-protected device 100, which compares the received result with the encrypted element 110 included within the security file 108 in the device 100.

A still further alternative is that computer 152 downloads the encrypted element 110 from the password-protected device 100 and also compares the computed result with the encrypted element 110.

As illustrated in G, irrespective of which of the above alternatives is implemented, if a match is found between the computed result and the encrypted element 110, a new password, the first receiving location password 140, is enabled to be set or is automatically set for the password-protected device 100.

One example of automatic setting of a new password is the generation of the new password using a one way function of the two secret codes. Another example is generating a new password using a random number generator.

An example of enabling a new password to be set is generating a dialog wherein authorized personnel at the first receiving location 104 are invited to enter a new password.

Upon setting of a new password, which is termed a "first receiving location password", for a password-protected device 100, the password-protected device 100 is considered to be in a first receiving location password protected (FRLPP) state.

Upon setting of a new password, such as the first received location password 140, the security file 108 is deleted. This may occur automatically or as the result of operator action at the first receiving location 104.

It is a particular feature of the present invention that, as described hereinabove, shipping of the password-protected devices 100 between disparate locations under password-protected security is achieved without sharing the passwords between personnel at the disparate locations. More specifically, the password-protected devices 100 are transitioned between a shipping location password-protected (SLPP) state to a password-protected, password inaccessible (PPPI) state in which no password-protected access is available and thence to a first receiving location password-protected (FRLPP) state.

Upon setting of the first receiving location password 140, various security-sensitive operations, such as loading customer-specific applications, customer specific configuration and loading customer-specific encryption keys may be carried out on the password-protected device 100 in the FRLPP state.

Further in accordance with a preferred embodiment of the present invention, as seen at H, at least one security file, indicated pictorially by reference numeral 158, including an encrypted element, indicated pictorially by reference numeral 160, is generated at the second receiving location, here customer location 106, typically located in Tokyo, using a one-way encryption function utilizing at least one secure code. As illustrated, typically two secret codes 162 and 164, such as strings containing at least six characters, which are each individually held by a trusted individual, are input to a computer 166.

Preferably the computer 166 employs a one-way encryption function, such as a hash function, e.g. SHA1, SHA256 or MD5, utilizing the two secret codes 162 and 164 to generate the at least one security file 158 including the encrypted element 160. The at least one security file 158 is preferably authenticated by computer 166 or by another computer to confirm that it has been created and sent by authorized personnel at the customer location 106 and has not been modified subsequently.

The at least one security file 158 may be sent electronically, as by an email 168, to the deployment facility 104 at which the password-protected devices 100 in the FRLPP state are located. It is appreciated that transmission of the security file 158 need not necessarily be encrypted or otherwise protected, since the contents of the security file 158, particularly the encrypted element 160, are themselves encrypted.

As seen at I, following receipt of the at least one security file 158 at the deployment facility 104, typically by email 168, personnel at the deployment facility 104, using the at least one first receiving location password 140, preferably confirm the authenticity of the received at least one security file 158 and load the at least one security file 158 into at least one password-protected device 100, typically employing a computer 169, which may be the same computer as computers 152 or 117. At this stage the personnel at the deployment facility 104 cause the at least one first receiving location password 140 to become expired, such that security-sensitive subsequent operational/management access to the password-protected devices 100 requires a new password.

At this stage, the password-protected devices 100 are considered to be in an intermediate password-protected state, wherein they can no longer be accessed by using the first receiving location password 140 and they cannot be accessed until a new authorized password is implemented, as described hereinbelow. This state is the "password-protected, password-inaccessible (PPPI) state".

As seen at J, at least one password-protected device 100 in the PPPI state, having loaded therein at least one security file 158, is shipped from the deployment facility 104 to a second receiving location, which is typically the customer location 106.

Thereafter, as seen at K, at the second receiving location 106, personnel at the second receiving location 106 preferably employ the secure codes 162 and 164, originally used to create the encrypted element 160 incorporated in the security file 158, to supply an input to the received at least one password-protected device 100 in the PPPI state and employ the at least one security file 158 to enable establishment of at least one second receiving location password 170 for the received at least one password-protected device 100, which replaces the at least one first receiving location password 140, which is now expired.

As shown at K, in the illustrated embodiment, following arrival of the password-protected devices 100 at the second receiving location 106, the two secret codes 162 and 164, each typically individually held by the same trusted individuals referenced above at H, are preferably input to a computer 182, which may be, but need not necessarily be, the same as computer 166, which supplies inputs to the received password-protected devices 100.

As shown at L, the computer 182 may transmit the secret codes 162 and 164 directly to the password-protected devices 100. In such a case, each password-protected device 100 uses the one way function to compute a result which it compares with the encrypted element 160 included within the security file 158.

Alternatively, personnel at the second receiving location 106 may enter the secret codes 162 and 164 directly into to the password-protected devices 100 without using computer 182. In such a case, the password-protected device 100 uses the one way function to compute a result which it compares with the encrypted element 160 contained within the security file 158.

As a further alternative, computer 182 may use the one way function to compute a result which it supplies to the password-protected device 100, which compares the received result with the encrypted element 160 contained within the security file 158 in the password-protected device.

A still further alternative is that computer 182 downloads the encrypted element 160 from the password-protected device 100 and also compares the computed result with the encrypted element 160.

As shown at M, irrespective of which of the above alternatives is implemented, if a match is found between the computed result and the encrypted element 160, a new password, the second receiving location password 170, is enabled to be set or is automatically set for the password-protected device 100. Upon setting of the second receiving location password 170, various security-sensitive operations, such as loading customer-specific configurations, such as new network addresses, and loading customer-specific encryption keys for customer payment schemes as well as downloading payment scheme specific parameters, may be carried out on the password-protected device 100.

Upon setting of a new password, which is termed a "second receiving location password", for a password-protected device 100, the password-protected device 100 is considered to be in a second receiving location password protected (SR-LPP) state.

Upon setting of a new password, such as the second received location password 170, the security file 158 is deleted. This may occur automatically or as the result of operator action at the second receiving location 106.

As noted above, it is a particular feature of the present invention that, as described hereinabove, shipping of the password-protected devices 100 between disparate locations under password-protected security is achieved without sharing the passwords between personnel at the disparate locations. More specifically, the password-protected devices 100 are here transitioned between a first receiving location password-protected state to an intermediate state in which no password-protected access is available and thence to a second receiving location password-protected state.

Figure 2A:
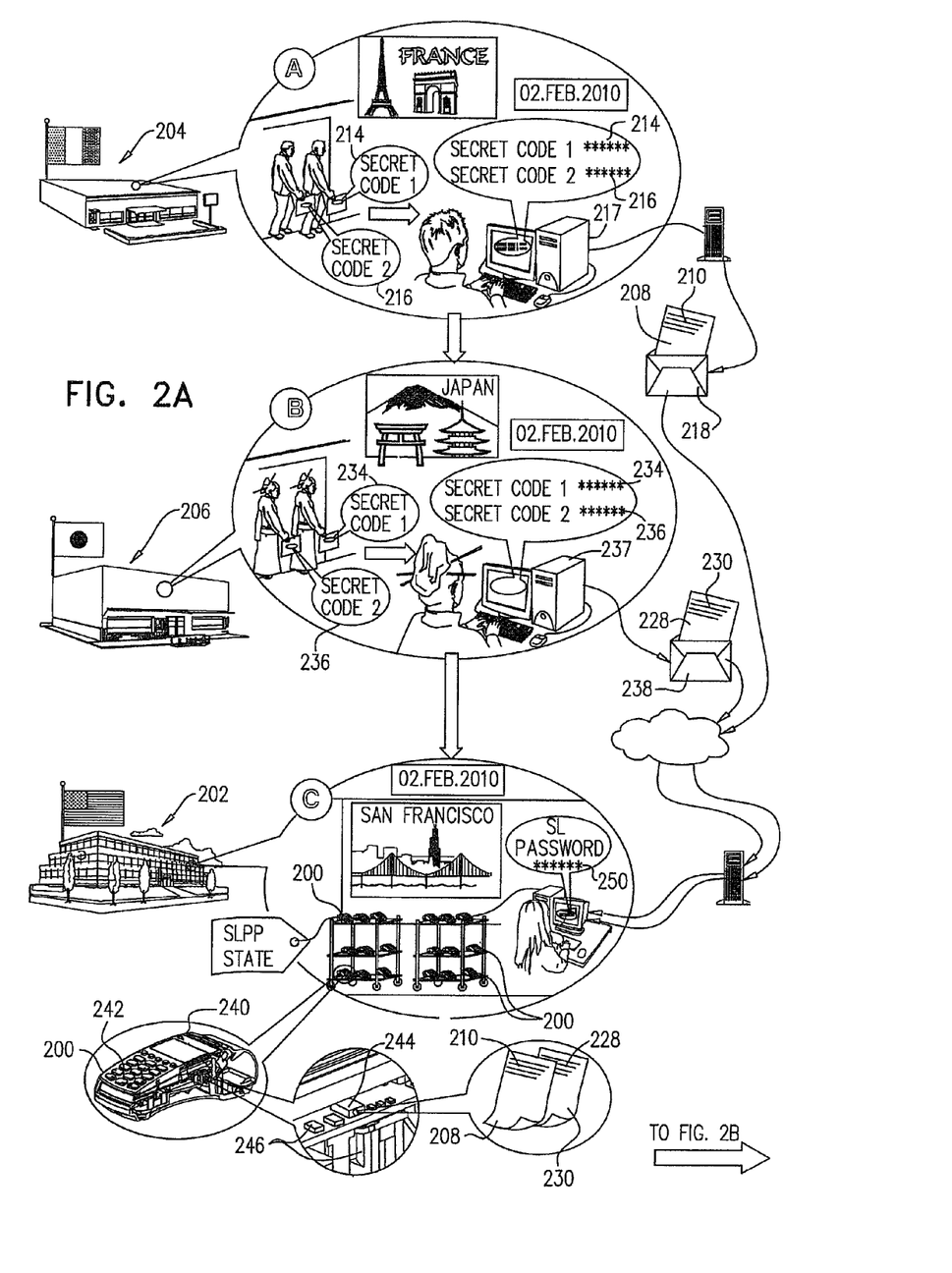
FIGS. 2A-2D are together a simplified pictorial illustration of applications of another preferred embodiment of the present invention.
Figure 2B:
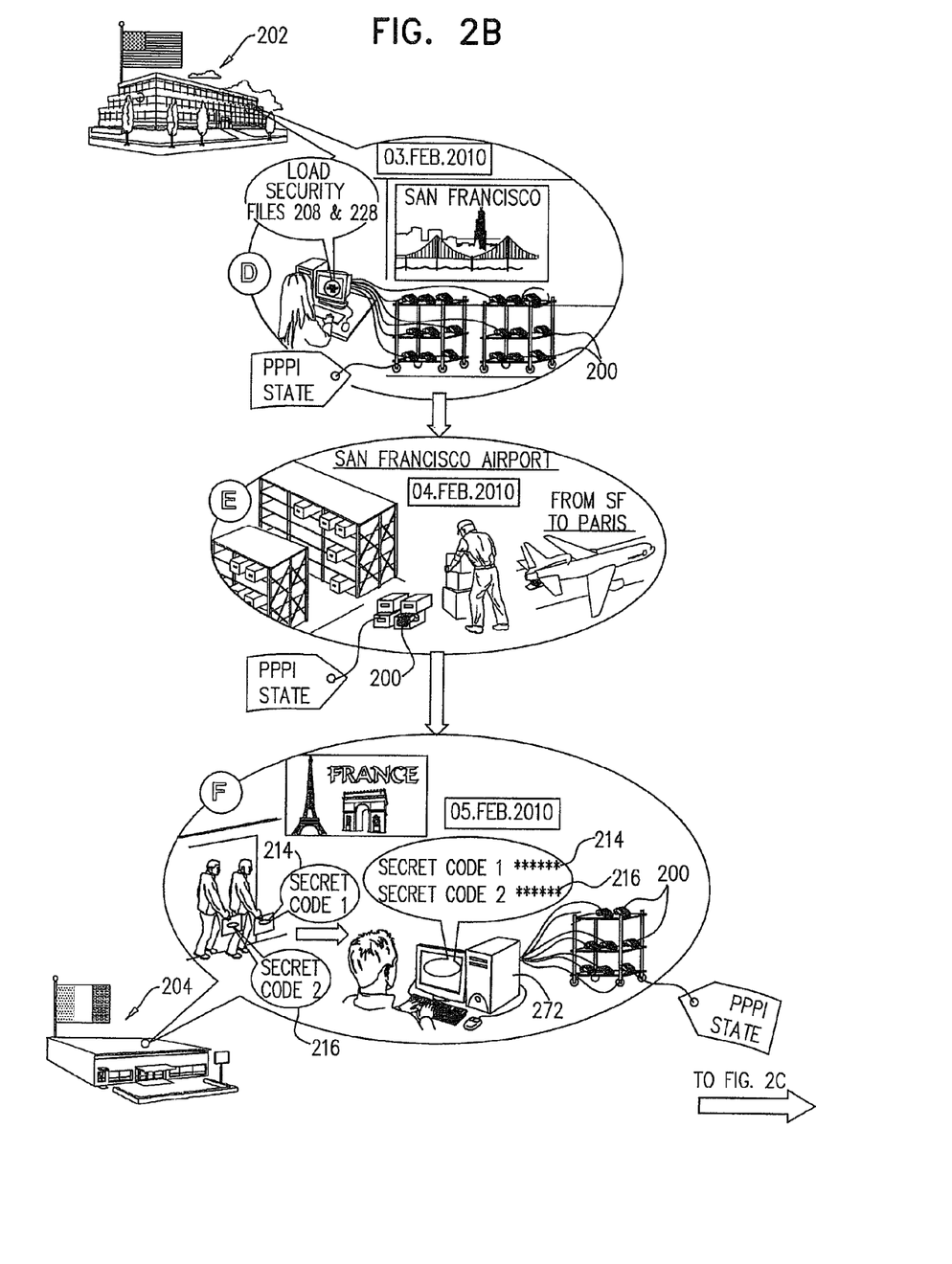
Figure 2C:
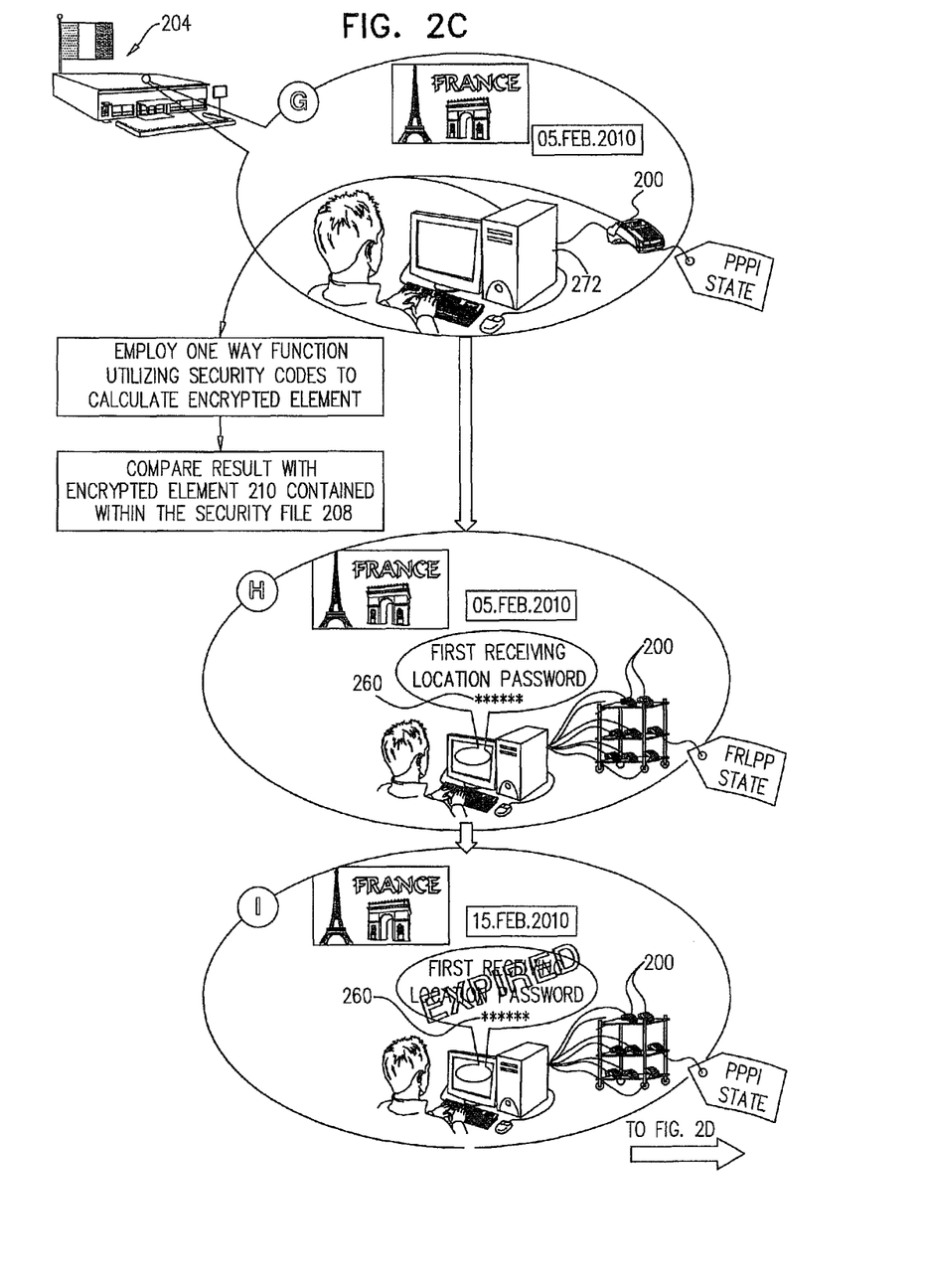
Figure 2D:
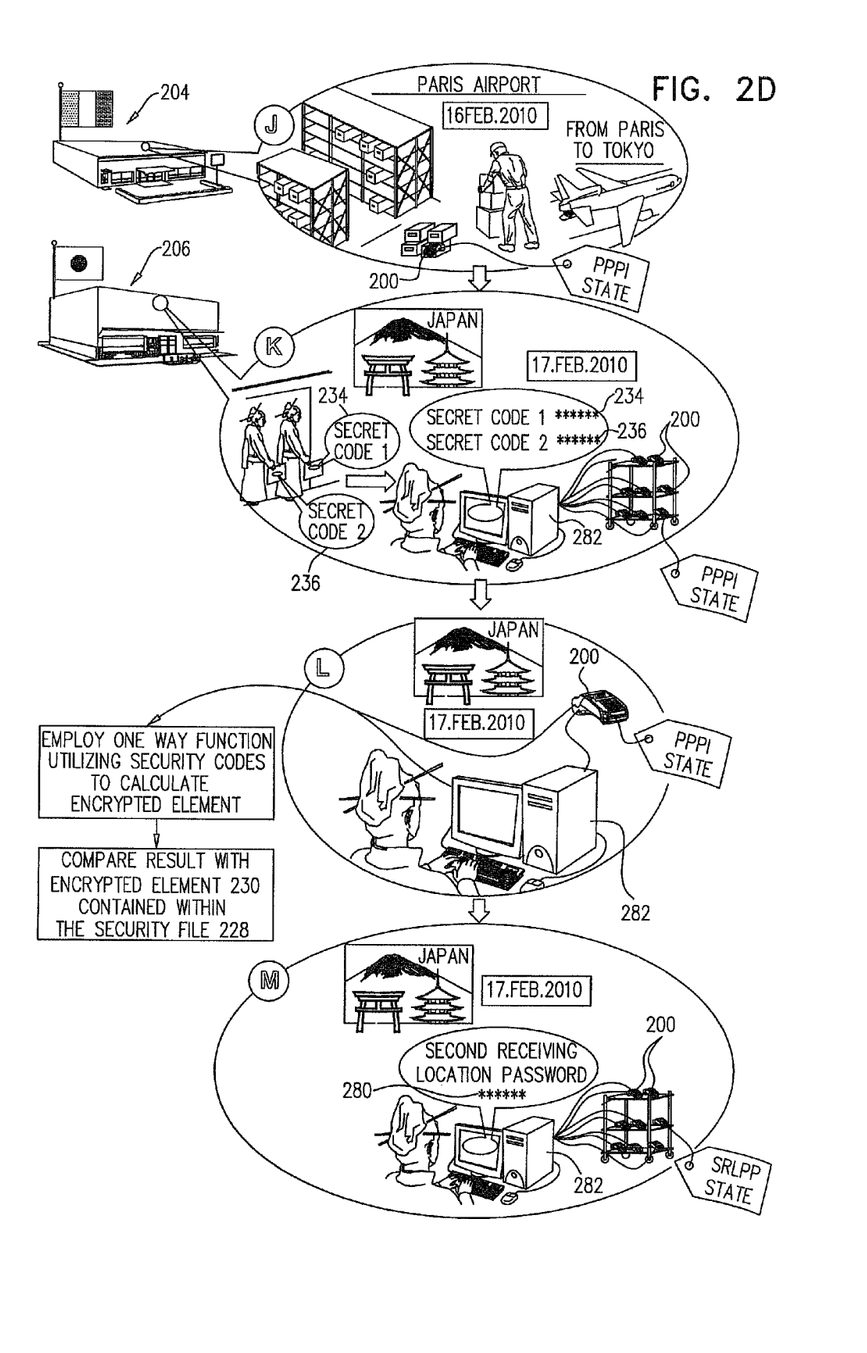

Reference is now made to FIGS. 2A-2D, which illustrate one example of a preferred embodiment of the present invention. As seen in FIGS. 2A-2D, the present invention provides a method for password-protected physical transfer of password-protected devices 200 from a shipping location, such as a manufacturing facility 202, typically located in San Francisco, to a first receiving location, such as a deployment facility 204, typically located in Paris, and onward to second receiving location, such as a customer location 206, typically located in Tokyo.

In this embodiment a plurality of security files which are adapted to be accessed in a predetermined sequence are loaded into the password-protected devices 200 at the shipping location.

As shown at A, in accordance with a preferred embodiment of the present invention, at least one security file, indicated pictorially by reference numeral 208, including an encrypted element, indicated pictorially by reference numeral 210, is generated at the first receiving location, here deployment facility 204 using a one-way encryption function utilizing at least one secure code. As illustrated, typically two secret codes 214 and 216, such as strings containing at least six characters, which are each individually held by a trusted individual, are input to a computer 217.

Preferably, the computer 217 employs a one-way encryption function, such as a hash function, e.g. SHA2, SHA256 or MD5, utilizing the two secret codes 214 and 216 to generate the at least one security file 208 including the encrypted element 210. The at least one security file 208 is preferably authenticated by computer 217 or by another computer to confirm that the security file 208 has been created and sent by the deployment facility 204 and has not been modified subsequently.

The at least one security file 208 may be sent electronically, as by an email 218, to the shipping location 202 at which the password-protected devices 200 are located. It is appreciated that transmission of the security file 208 need not necessarily be encrypted or otherwise protected, since the contents of the security file 208, particularly the encrypted element 210, are themselves encrypted.

As shown at B, in accordance with a preferred embodiment of the present invention, at least one security file, indicated pictorially by reference numeral 228, including an encrypted element, indicated pictorially by reference numeral 230, employing a one-way encryption function utilizing at least one secure code, is generated at the second receiving location, here customer location 206. As illustrated, typically two secret codes 234 and 236, such as strings containing at least six characters, which are each individually held by a trusted individual, are input to a computer 237.

Preferably the computer 237 employs a one-way encryption function, such as a hash function, e.g. SHA2, SHA256 or MD5, utilizing the two secret codes 234 and 236 to generate the at least one security file 228 including the encrypted element 230. The at least one security file 228 is preferably authenticated by computer 237 or by another computer to confirm that the security file 228 has been created by personnel at customer location 206 and has not been modified subsequently.

The at least one security file 228 may be sent electronically, as by an email 238, to the shipping location 202 at which the password-protected devices 200 are located. It is appreciated that transmission of the security file 228 need not necessarily be encrypted or otherwise protected, since the contents of the security file 228, particularly the encrypted element 230, are themselves encrypted.

In the illustrated embodiment as shown at C, the password-protected devices 200 are point of sale (POS) terminals, which are subject to stringent security requirements, such as PCI version2 established by the PCI Security Standards Council, at all stages of their manufacture and transfer to their operating locations. For the purposes of the present description and claims, the term "point of sale terminals" includes, inter alia, PIN pads, electronic cash registers, ATMs, card payment terminals and the like. It is appreciated that the present invention is not limited to POS terminals but applies also to other types of password-protected devices which are subject to stringent security requirements.

It is appreciated that the term "password" is used in a general sense to refer to any type of suitable credential, such as a password, passphrase and PIN.

The password-protected devices 200 may have various alternative functionalities. Generally speaking, they each include a housing 240, a user interface 242 such as a keyboard, a memory 244 adapted to contain, inter alia, security files 208 and 228, computer hardware 246 located within the housing 220 and interfacing with the user interface 242 and the memory 244, computer software running on computer hardware 246, including an operating system stored in memory 244 and containing code useable by the operating system to enable a change in a password, responsive to at least one predetermined coded input and to the encrypted elements 210 and 230 included in the respective security files 208 and 228.

Additionally, the password-protected devices 200 may also incorporate functionality for comparing a received string with each of the encrypted elements 210 and 230. As a further alternative, the password-protected devices 200 may also have functionality for computing a string, using a one way function, which may be identical to the one way function employed to generate each of the encrypted elements 210 and 230.

Personnel at the shipping location 202, using at least one shipping location password 250, may perform security-sensitive operations on the password-protected devices 200, such as performing tests, loading software, configuring the devices, such as adding serial numbers, and adding encryption keys to enable remote servicing of the password-protected devices 200. At this stage, the shipping location password-protected devices 200 are considered to be in a "shipping location password protected (SLPP) state".

As seen at D, following receipt of the at least one security file 208 and the at least one security file 228 at the shipping location 202, typically by emails 218 and 238, personnel at the shipping location 202, using the least one shipping location password 250, preferably confirm the authenticity of the received at least one security file 208 and the at least one security file 228. Preferably personnel at the shipping location 202 load the at least one security file 208 and load the at least one security file 228 into at least one password-protected device 200.

In accordance with one embodiment of the invention, a composite security file including security files 208 and 228 is created and loaded into the password-protected devices 200. Such a composite security file preferably includes instructions as to the sequence in which the security files may be utilized. For example, such instructions may specify that security file 208 must be utilized initially and must be deleted before security file 228 may be utilized. Alternatively, such instructions may be contained in the operating system present in password-protected devices and not in a composite security file.

At this stage the personnel at the shipping location cause the shipping location password 250 to become expired, such that security-sensitive subsequent operational/management access to the password-protected devices 200 requires a new password. At this stage, the password-protected devices 200 are considered to be in an intermediate password-protected state, wherein they can no longer be accessed by using the shipping location password 250 and they cannot be accessed until a new authorized password is implemented, as described hereinbelow. This state is termed a "password-protected, password-inaccessible (PPPI) state".

As seen at E, at least one password-protected device 200 in the PPPI state, having loaded therein at least one security file 208 and at least one security file 228, is shipped from the shipping location 202 to the first receiving location 204.

As shown at F-I, thereafter, at the first receiving location 204, personnel at the first receiving location 204 preferably employ the secure codes 214 and 216, originally used to create the encrypted element 210 incorporated in the security file 208, to supply an input to the received at least one password-protected device 200 in the PPPI state and employ the at least one security file 208 to enable establishment of at least one first receiving location password 260 for the received at least one password-protected device 200, which replaces the at least one shipping location password 250, which previously expired.

As indicated at F, in the illustrated embodiment, following arrival of the password-protected devices 200 in the PPPI state at the first receiving location 204, the two secret codes 214 and 216, each typically individually held by the same trusted individuals referenced above at A, are preferably input to a computer 272, which may be, but need not necessarily be, the same as computer 217, which supplies inputs to the received password-protected devices 200 in the PPPI state.

As illustrated in G, the computer 272 may transmit the secret codes 214 and 216 directly to the password-protected devices 200 in the PPPI state. In such a case, each password-protected device 200 in the PPPI state employs the one way function to compute a result which it compares with the encrypted element 210 included within the security file 208.

Alternatively, personnel at the first receiving location 204 may enter the secret codes 214 and 216 directly into to the password-protected devices 200 in the PPPI without using computer 272. In such a case, the password-protected device 200 in the PPPI state uses the one way function to compute a result which it compares with the encrypted element 210 included within the security file 208.

As a further alternative, computer 272 may use the one way function to compute a result which it supplies to the password-protected device 200, which compares the received result with the encrypted element 210 included within the security file 208 in the password-protected device 200.

A still further alternative is that computer 272 downloads the encrypted element 210 from the password-protected device 200 and also compares the computed result with the encrypted element 210.

As illustrated in H, irrespective of which of the above alternatives is implemented, if a match is found between the computed result and the encrypted element 210, a new password, the first receiving location password 260, is enabled to be set or is automatically set for the password-protected device 200.

One example of automatic setting of a new password is the generation of the new password using a one way function of the two secret codes. Another example is generating of a new password using a random number generator.

An example of enabling a new password to be set is generating a dialog wherein authorized personnel at the first receiving location 204 are invited to enter a new password.

Upon setting of a new password, which is termed a "first receiving location password", for a password-protected device 200, the password-protected device 200 is considered to be in a first receiving location password protected (FRLPP) state.

Upon setting of a new password, such as the first received location password 260, the security file 208 is deleted. This may occur automatically or as the result of operator action at the first receiving location 204.

Upon setting of the first receiving location password 260, various security-sensitive operations, such as loading customer-specific applications, customer specific configuration and loading customer-specific encryption keys may be carried out on the password-protected device 200 in the FRLPP state.

As seen at I, personnel at the deployment facility 204, using the at least one first receiving location password 260, cause the at least one first receiving location password 260 to become expired, such that security-sensitive subsequent operational/management access to the password-protected devices 200 requires a new password.

At this stage, the password-protected devices 200 are considered to be in an intermediate password-protected state, wherein they can no longer be accessed by using the first receiving location password 260 and they cannot be accessed until a new authorized password is implemented, as described hereinbelow. This state is the "password-protected, password-inaccessible (PPPI) state".

As seen at J, at least one password-protected device 200 in the PPPI state, having loaded therein at least one security file 228, is shipped from the deployment facility 204 to a second receiving location, which is typically the customer location 206.

Thereafter, as seen at K, at the second receiving location 206, personnel at the second receiving location 206 preferably employ the secure codes 234 and 236, originally used to create the encrypted element 230 incorporated in the security file 228, to supply an input to the received at least one password-protected device 200 in the PPPI state and employ the at least one security file 228 to enable establishment of at least one second receiving location password 280 for the received at least one password-protected device 200, which replaces the at least one first receiving location password 260, which is now expired.

As shown at K, in the illustrated embodiment, following arrival of the password-protected devices 200 at the second receiving location 206, the two secret codes 234 and 236, each typically individually held by the same trusted individuals referenced above at B, are preferably input to a computer 282, which may be, but need not necessarily be, the same as computer 237, which supplies inputs to the received password-protected devices 200.

As shown at L, the computer 282 may transmit the secret codes 234 and 236 directly to the password-protected devices 200. In such a case, each password-protected device 200 uses the one way function to compute a result which it compares with the encrypted element 230 included within the security file 228.

Alternatively, personnel at the second receiving location 206 may enter the secret codes 234 and 236 directly into to the password-protected devices 200 without using computer 282. In such a case, the password-protected device 200 uses the one way function to compute a result which it compares with the encrypted element 230 contained within the security file 228.

As a further alternative, computer 282 may use the one way function to compute a result which it supplies to the password-protected device 200, which compares the received result with the encrypted element 230 contained within the security file 228 in the password-protected device.

A still further alternative is that computer 282 downloads the encrypted element 230 from the password-protected device 200 and also compares the computed result with the encrypted element 230.

As shown at M, irrespective of which of the above alternatives is implemented, if a match is found between the computed result and the encrypted element 230, a new password, the second receiving location password 280, is enabled to be set or is automatically set for the password-protected device 200. Upon setting of the second receiving location password 280, various security-sensitive operations, such as loading customer-specific configurations, such as new network addresses, and loading customer-specific encryption keys for customer payment schemes as well as downloading payment scheme specific parameters, may be carried out on the password-protected device 200.

Upon setting of a new password, which is termed a "second receiving location password", for a password-protected device 200, the password-protected device 200 is considered to be in a second receiving location password protected (SR-LPP) state.

Upon setting of a new password, such as the second received location password 280, the security file 228 may be deleted. This may occur automatically or as the result of operator action at the second receiving location 206.

As noted above, it is a particular feature of the present invention that, as described hereinabove, shipping of the password-protected devices 200 between disparate locations under password-protected security is achieved without sharing the passwords between personnel at the disparate locations. More specifically, the password-protected devices 200 are here transitioned in a predetermined sequence established by sequence instructions between a shipping location password-protected state to an intermediate state in which no password-protected access is available, thence to a first receiving location password-protected state, thence to an intermediate state in which no password-protected access is available and thence to a second receiving location password-protected state.

It is appreciated by persons skilled in the art that the present invention is not limited by what has been particularly shown and described hereinabove. Rather the scope of the present invention includes both combinations and subcombinations of various features described hereinabove as well as variations and modifications thereto which would occur to a person of skill in the art upon reading the above description and which are not in the prior art.

The invention claimed is:

1. A method for password-protected physical transfer of password-protected devices comprising:
   at a receiving location, generating at least one security file including an encrypted element generated using a one-way encryption function utilizing at least one secure code;
   transmitting said at least one security file to a shipping location at which said password-protected devices are located;
   at said shipping location, using at least one shipping location password, loading said at least one security file into at least one password-protected device;
   shipping said at least one password-protected device having loaded therein said at least one security file from said shipping location to said receiving location; and
   at said receiving location, employing said at least one secure code to supply an input to said at least one password-protected device and employing said at least one security file to enable establishment of at least one receiving location password for said at least one password-protected device which replaces said at least one shipping location password.

2. A method for password-protected physical transfer of password-protected devices according to claim 1 and wherein said at least one security file utilizes plural secure codes held at said receiving location.

3. A method for password-protected physical transfer of password-protected devices according to claim 2 and wherein said security file is created by employing a one-way encryption function utilizing said plural secure codes.

4. A method for password-protected physical transfer of password-protected devices according to claim 3 and wherein said security file is authenticated to confirm that the security file was created at said receiving location and was not modified subsequently.

5. A method for password-protected physical transfer of password-protected devices according to claim 1 and wherein said password-protected devices are point of sale (POS) terminals which are subject to stringent security requirements at all stages of their manufacture and transfer to their operating locations.

6. A method for password-protected physical transfer of password-protected devices according to claim 5 and wherein said security requirements are requirements established by the PCI Security Standards Council.

7. A method for password-protected physical transfer of password-protected devices according to claim 1 and wherein personnel at said shipping location, using said at least one shipping location password, perform security-sensitive operations on said at least one password-protected device and load said at least one security file onto said at least one password-protected device when said at least one password-protected device is in a shipping location password protected (SLPP) state.

8. A method for password-protected physical transfer of password-protected devices according to claim 7 and wherein personnel at said shipping location, using said at least one shipping location password, load said at least one security file into said at least one password-protected device and cause said shipping location password to become expired whereby said at least one password-protected device is in a password-protected, password-inaccessible (PPPI) state, wherein it can no longer be accessed by using said shipping location password and cannot be accessed until said at least one receiving location password is implemented.

9. A method for password-protected physical transfer of password-protected devices according to claim 7 and wherein at said receiving location said at least one password-protected device compares a string created at said receiving location using said at least one secure code with said encrypted element, thereby to enable implementation of said at least one receiving location password.

10. A method for password-protected physical transfer of password-protected devices according to claim 9 and wherein personnel at said receiving location, using at least one receiving location password, perform security-sensitive operations on said at least one password-protected device when said at least one password-protected device is in a first receiving location password protected (FRLPP) state.

11. A method for password-protected physical transfer of password-protected devices according to claim 1 and wherein said at least one security file comprises a plurality of security files which are adapted to be accessed in a predetermined sequence.

12. A method for password-protected physical transfer of password-protected devices according to claim 11 and wherein personnel at said shipping location, using said at least one shipping location password, perform security-sensitive operations on said at least one password-protected device and load said plurality of security files onto said at least one password-protected device, when said at least one password-protected device is in a shipping location password protected (SLPP) state.

13. A method for password-protected physical transfer of password-protected devices according to claim 11 and wherein personnel at said shipping location, using said at least one shipping location password, load said plurality of security files into said at least one password-protected device and cause said shipping location password to become expired whereby said at least one password-protected device is in a password-protected, password-inaccessible (PPPI) state, wherein it can no longer be accessed by using said shipping location password and cannot be accessed until said at least one receiving location password is implemented.

14. A method for password-protected physical transfer of password-protected devices according to claim 13 and wherein at said receiving location said at least one password-protected device compares a string created at said receiving location using said at least one secure code with said encrypted element, thereby to enable implementation of said at least one receiving location password.

15. A method for password-protected physical transfer of password-protected devices according to claim 14 and wherein personnel at said receiving location, using at least one receiving location password, perform security-sensitive operations on said at least one password-protected device when said at least one password-protected device is in a first receiving location password protected (FRLPP) state.

16. A method for password-protected physical transfer of password-protected devices according to claim 15 and wherein personnel at a second receiving location, using at least one second receiving location password, perform security-sensitive operations on said at least one password-protected device when said at least one password-protected device is in a second receiving location password protected (SRLPP) state.

* * * * *